United States Patent
Hudspeth

(10) Patent No.: US 8,214,867 B2
(45) Date of Patent: *Jul. 3, 2012

(54) DELIVERY OF FEEDBACK INFORMATION TO SCHEDULING SERVICE TO DETERMINE OPTIMUM BROADCAST TIMES BASED UPON CLIENT PLATFORM TUNER CONTENTION

(75) Inventor: John W. Hudspeth, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/718,913

(22) Filed: Mar. 5, 2010

(65) Prior Publication Data
US 2010/0162287 A1 Jun. 24, 2010

Related U.S. Application Data

(63) Continuation of application No. 09/952,690, filed on Sep. 13, 2001, now Pat. No. 7,703,118.

(51) Int. Cl.
*H04N 7/173* (2011.01)
(52) U.S. Cl. .......... 725/93; 725/9; 725/14; 725/16; 725/46; 725/50; 725/97; 725/116; 725/146
(58) Field of Classification Search .............. 725/9, 14, 725/16, 46, 50, 93, 97, 116, 146
See application file for complete search history.

(56) References Cited

U.S. PATENT DOCUMENTS

| | | |
|---|---|---|
| 4,258,386 A | 3/1981 | Cheung |
| 5,155,762 A | 10/1992 | Croquet et al. |
| 5,555,441 A | 9/1996 | Haddad |
| 5,600,364 A | 2/1997 | Hendricks et al. |
| 5,610,653 A | 3/1997 | Abecassis |
| 5,619,250 A | 4/1997 | Mcclellan et al. |
| 5,635,989 A | 6/1997 | Rothmuller |
| 5,657,072 A | 8/1997 | Aristides et al. |
| 5,673,430 A | 9/1997 | Story |
| 5,724,521 A | 3/1998 | Dedrick |
| 5,758,257 A | 5/1998 | Herz et al. |
| 5,778,182 A | 7/1998 | Cathey et al. |
| 5,790,935 A | 8/1998 | Payton |
| 5,801,747 A | 9/1998 | Bedard |
| 5,819,156 A | 10/1998 | Belmont |
| 5,974,299 A | 10/1999 | Massetti |
| 6,064,977 A | 5/2000 | Haverstock et al. |

(Continued)

FOREIGN PATENT DOCUMENTS

JP 9-224230 8/1997

(Continued)

OTHER PUBLICATIONS

Patent Abstracts of Japan, vol. 2000, No. 13, Feb. 5, 2001 & JP 2000 278621 A(Mitsubishi Electric Corp), Oct. 6, 2000 abstract.

(Continued)

*Primary Examiner* — Jason Salce
(74) *Attorney, Agent, or Firm* — Blakely, Sokoloff, Taylor & Zafman LLP

(57) ABSTRACT

Delivery of feedback information to a scheduling service to determine optimum broadcast times based upon client platform tuner contention is described. A usage pattern of an electronic media device is recorded. The usage pattern is communicated to a scheduling server. Media content is received during a time period selected by the scheduling server based upon the usage pattern.

19 Claims, 7 Drawing Sheets

U.S. PATENT DOCUMENTS

| | | | |
|---|---|---|---|
| 6,075,526 | A | 6/2000 | Rothmuller |
| 6,209,131 | B1 | 3/2001 | Kim et al. |
| 6,286,005 | B1 | 9/2001 | Cannon |
| 6,286,140 | B1 | 9/2001 | Ivanyi |
| 6,389,593 | B1 | 5/2002 | Yamagishi |
| 6,449,632 | B1 | 9/2002 | David et al. |
| 6,467,089 | B1 | 10/2002 | Aust et al. |
| 6,530,082 | B1 | 3/2003 | Del Sesto et al. |
| 6,760,918 | B2 | 7/2004 | Rodriguez et al. |
| 6,774,926 | B1 | 8/2004 | Ellis et al. |
| 6,874,161 | B1 | 3/2005 | Wasserman et al. |
| 7,146,627 | B1 | 12/2006 | Ismail et al. |
| 2002/0029291 | A1 | 3/2002 | Crandall |
| 2003/0018973 | A1 | 1/2003 | Thompson |
| 2004/0158857 | A1 | 8/2004 | Finseth et al. |

FOREIGN PATENT DOCUMENTS

| | | |
|---|---|---|
| JP | 9510327 | 10/1997 |
| WO | WO-9901984 | 1/1999 |
| WO | WO-0016552 | 3/2000 |
| WO | WO-0150438 | 7/2001 |

OTHER PUBLICATIONS

Search Resort for PCT/US 02/26099, Mailed Oct. 24, 2002, 2 pages.

Intel Corp., Non Final Office Action mailed Aug. 13, 2009; U.S. Appl. No. 09/952,690.

Intel Corp., Non Final Office Action mailed Dec. 19, 2008; U.S. Appl. No. 09/952,690.

Intel Corp., Non Final Office Action mailed Jan. 15, 2008; U.S. Appl. No. 09/952,690.

Intel Corp., Non Final Office Action mailed Mar. 26, 2007; U.S. Appl. No. 09/952,690.

Intel Corp., Non Final Office Action mailed Nov. 20, 2006; U.S. Appl. No. 09/952,690.

Intel Corp., Non Final Office Action mailed Dec. 12, 2005; U.S. Appl. No. 09/952,690.

Intel Corp., Non Final Office Action mailed Apr. 7, 2004; U.S. Appl. No. 09/952,690.

Intel Corp., Non Final Office Action mailed Jun. 19, 2003; U.S. Appl. No. 09/952,690.

Intel Corp., Final Office Action mailed Mar. 13, 2009; U.S. Appl. No. 09/952,690.

Intel Corp., Final Office Action mailed Jul. 8, 2008; U.S. Appl. No. 09/952,690.

Intel Corp., Final Office Action mailed Aug. 3, 2007; U.S. Appl. No. 09/952,690.

Intel Corp., Final Office Action mailed Jun. 8, 2006; U.S. Appl. No. 09/952,690.

Intel Corp., Final Office Action mailed Sep. 8, 2004; U.S. Appl. No. 09/952,690.

Intel Corp., Final Office Action mailed Jan. 2, 2004; U.S. Appl. No. 09/952,690.

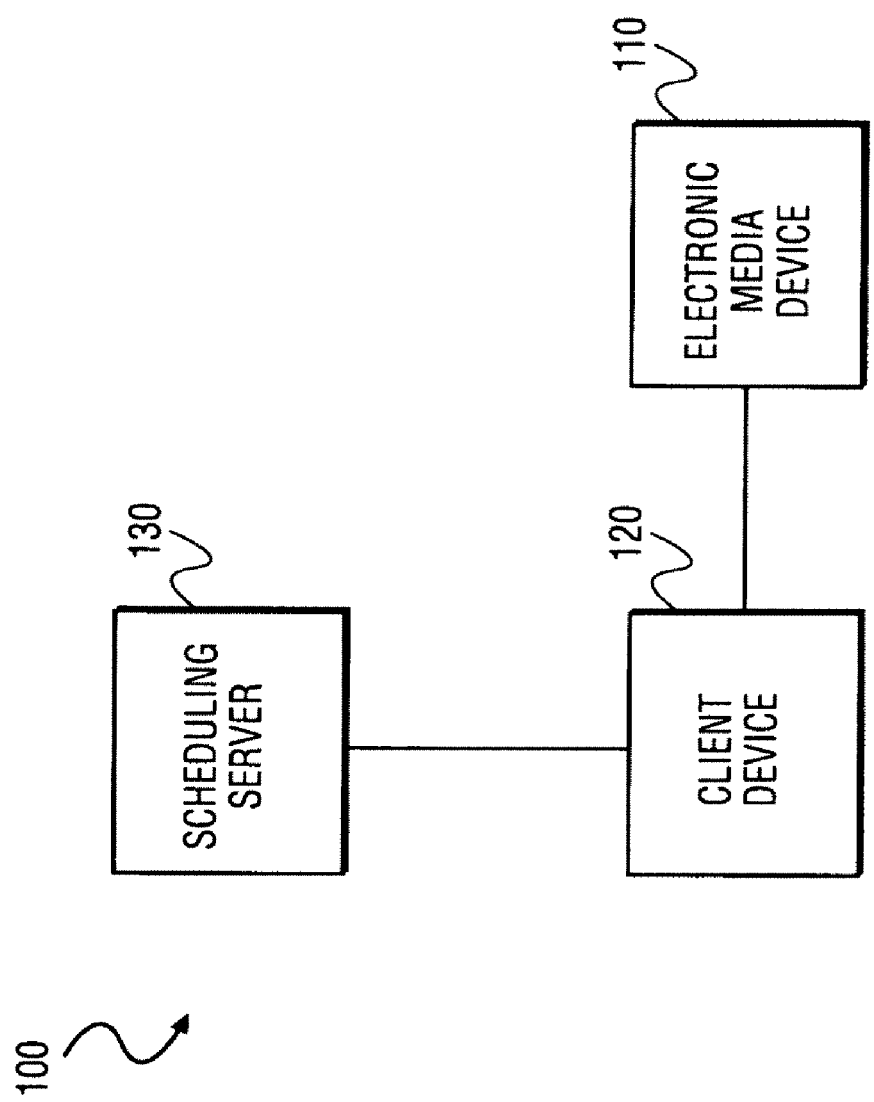

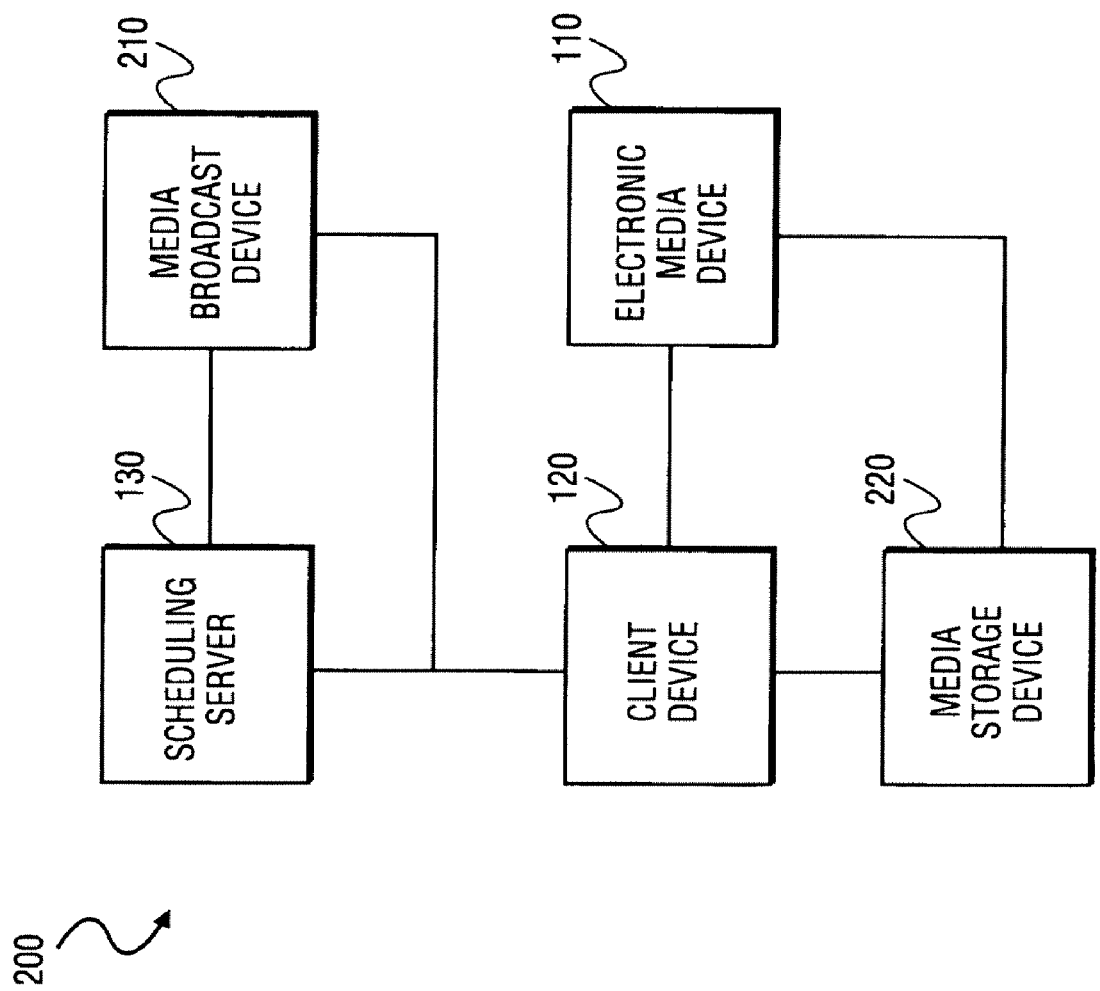

```
                ┌──────────────────────────────────────┐
                │ RECORDING A USAGE PATTERN OF AN      │
                │      ELECTRONIC MEDIA DEVICE         │
                │                 310                  │
                └──────────────────┬───────────────────┘
                                   ▼
                ┌──────────────────────────────────────┐
                │ COMMUNICATING THE USAGE PATTERN TO A │
                │          SCHEDULING SERVER           │
                │                 320                  │
                └──────────────────┬───────────────────┘
                                   ▼
                ┌──────────────────────────────────────┐
                │ RECEIVING MEDIA CONTENT DURING A     │
                │ TIME PERIOD SELECTED BY THE          │
                │ SCHEDULING SERVER BASED UPON THE     │
                │ USAGE PATTERN                        │
                │                 330                  │
                └──────────────────────────────────────┘
```

FIG. 3

DELIVERY OF FEEDBACK INFORMATION TO SCHEDULING SERVICE TO DETERMINE OPTIMUM BROADCAST TIMES BASED UPON CLIENT PLATFORM TUNER CONTENTION

RELATED APPLICATION

The application is a continuation of U.S. patent application Ser. No. 09/952,690, filed Sep. 13, 2001 issued as U.S. Pat. No. 7,703,118 on Apr. 20, 2010.

FIELD OF THE INVENTION

The field of the invention relates to interactive media devices in general and to using feedback information to determine an optimal time period for broadcasting data to an unutilized media receiver in particular.

BACKGROUND

Interactive television services provide a television viewer with the ability to view television programs in ways that they could not be viewed using only a state of the art television. Such services typically require the purchase of a special digital video receiver as well as a subscription to the service itself. The service powers the digital video receiver and uses phone lines to provide information and software needed to deliver special interactive TV features. These features include the ability to manipulate TV programs by pausing, rewinding or instantly replaying a portion of the broadcast, without missing succeeding action. The digital video receiver may also be equipped with a memory to remember a viewer's favorite television show and automatically make a digital recording of the program each time it airs. The service may provide a digital recorder that stores up to 30 hours of TV programming.

Additionally, a state of the art interactive television service may allow viewers to receive Internet content and services while also viewing television. The service may also offer a device equipped with two tuners for simultaneously recording two television programs.

However, despite all of the benefits of state of the art interactive television services, the potential for broadcasting media content to viewers is not optimized. Existing devices dedicate a digital video receiver to view real-time broadcast programs and do not take advantage of time periods during which the receiver resources are unutilized to receive content that can be stored and viewed at a later time.

BRIEF DESCRIPTION OF THE DRAWINGS

FIG. 1 is a diagram illustrating a system-level overview of one embodiment of the invention.

FIG. 2 is a diagram illustrating a system-level overview of another embodiment of the invention.

FIG. 3 is a flow diagram of a method to be performed according to the embodiment of the invention in FIG. 1, from a client-side perspective.

FIG. 4 is a flow diagram of a method to be performed according to the embodiment of the invention in FIG. 1, from a server-side perspective.

DETAILED DESCRIPTION

Figure 5:
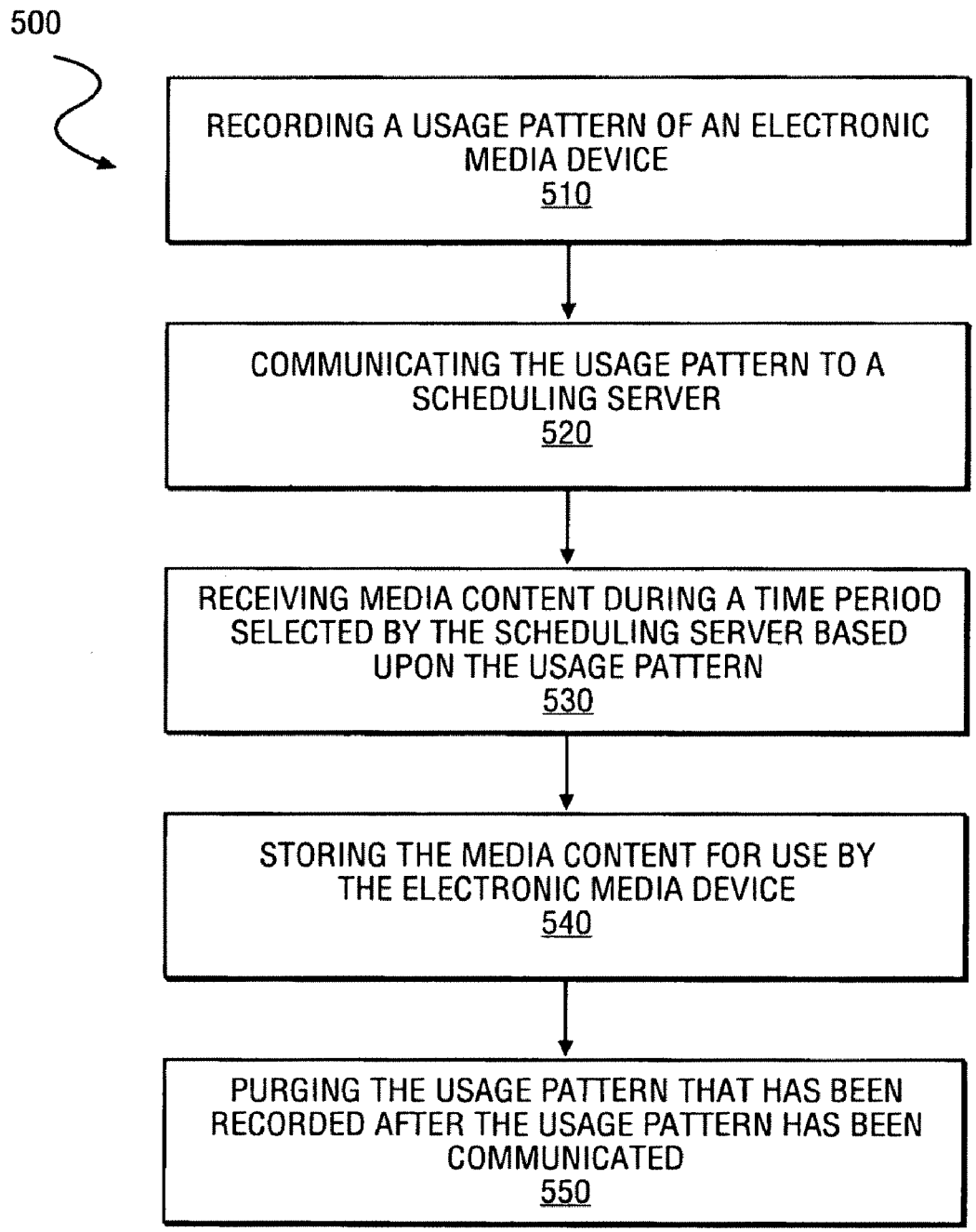
FIG. 5 is a flow diagram of a method to be performed according to the embodiment of the invention in FIG. 2, from a client-side perspective.

Delivery of feedback information to a scheduling service to determine optimum broadcast times based upon client platform tuner contention is described. In the following description, for purposes of explanation, numerous specific details are set forth in order to provide a thorough understanding of the invention. However, it will be apparent to one with ordinary skill in the art that these specific details need not be used to practice the present invention. In other instances, well-known structures and devices are shown in block diagram form in order to avoid unnecessarily obscuring the present invention.

A usage pattern of an electronic media device is recorded. The usage pattern is communicated to a scheduling server. Media content is received during a time period selected by the scheduling server based upon the usage pattern. By using tuner contention feedback information, i.e. by determining when a tuner is not regularly being utilized and by broadcasting media content to the tuner ("receiver") during that time period, utilization of the available electronic media resources may be optimized.

It will be appreciated by one of skill in the art that the term "broadcasting" includes broadcasting of television content, but the invention is not so limited. The term "broadcasting" also includes "datacasting" which is the broadcasting of any form of data. Datacasting includes the transmission of various kinds of data as a secondary service on a digital broadcasting network. Such a network can be terrestrial, satellite or cable. The "data" can be information, interactive multimedia (including video), or Internet downloads, but the invention is not so limited.

FIG. 1 is a diagram illustrating a system-level overview of one embodiment of the invention. Electronic media device 110 is communicatively coupled to client device 120. Electronic media device 110 may be a television, an audio receiver, or a digital processing system, but the invention is not so limited. Client device 120 may be a set top box, or other electronic device. A set top box is a box that nominally sits in close proximity to a television set and is the interface between the home television and a media service provider, such as, for example, a cable MSO (multiple system operator). Client device 120 records a usage pattern of the electronic media device 110 by a user and communicates the usage pattern to scheduling server 130. The scheduling server 130, communicatively coupled to the client device 120 to receive the usage pattern from the client device 120, calculates an optimal schedule for broadcasting media content to the client device 120 based upon the usage pattern.

In one embodiment the optimal schedule comprises a time period having a pre-defined likelihood of the client device being capable of receiving the media content. In another embodiment the optimal schedule comprises a time period calculated by the scheduling server to have a pre-defined likelihood that the client device is not being used to view or record real-time broadcast media content.

In yet another embodiment, communication between client device 120 and scheduling server 130 occurs over a back channel. In still another embodiment the back channel may be implemented by an analog modem, a digital modem, or a DOCSIS cable modem, but the invention is not so limited.

FIG. 2 is a diagram illustrating a system-level overview of another embodiment of the invention. Scheduling server 130 is communicatively coupled to media broadcast device 210 to broadcast the media content to the client device 120. In another embodiment, media broadcast device 210 is a component of the scheduling server 130.

In yet another embodiment, the client device 120 is communicatively coupled to media storage device 220 to store media content that has been broadcasted for usage by the electronic media device 110. In still another embodiment, the media storage device 220 is a component of client device 120.

FIG. 3 is a flow diagram of a method to be performed according to the embodiment of the invention in FIG. 1, from a client-side perspective. At block 310, a usage pattern of an electronic media device is recorded. In one embodiment, the usage pattern comprises a day of use, a time of use, and elapsed time of use, but the invention is not so limited. The usage pattern may also include information such as channel selection during a time of use, an audio volume adjustment during a time of use, and whether a program was recorded during a time of use. At block 320, the usage pattern is communicated to a scheduling server. At block 330, media content is received during a time period selected by the scheduling server based upon the usage pattern.

In one embodiment the usage pattern comprises a pattern of interaction by a user with the electronic media device. Such interaction may include turning the device on or off, changing the channel or frequency of the device, adjusting the volume of the device, or recording data with the device, but the invention is not so limited. In another embodiment, an interaction of the user with the electronic media device is not communicated to the scheduling server if a duration of time between the interaction and an immediately previous interaction exceeds a pre-defined duration. For example, if a television viewer did not have any interaction with the television, such as changing the channel, for a set period of time, such as for example, a six-hour period, then the last interaction will be removed from the usage pattern.

FIG. 4 is a flow diagram of a method to be performed according to the embodiment of the invention in FIG. 1, from a server-side perspective. At block 410, the usage pattern of the electronic media device is received at the scheduling server. At block 420, the scheduling server calculates an optimal schedule for broadcasting media content based upon the usage pattern. In one embodiment, the optimal schedule comprises a time period having a pre-defined likelihood of a receiving device coupled to the electronic media device being capable of receiving the media content. In another embodiment, the electronic media device is capable of receiving the media content when its receiver resources are unutilized by real-time or other use by the user.

FIG. 5 is a flow diagram of a method to be performed according to the embodiment of the invention in FIG. 2, from a client-side perspective. At block 510, a usage pattern of an electronic media device is recorded. At block 520, the usage pattern is communicated to a scheduling server. At block 530, media content is received during a time period selected by the scheduling server based upon the usage pattern. At block 540, the media content is stored for use by the electronic media device. In one embodiment the media content may be temporarily stored in a cache memory. At block 550, the usage pattern is purged after the usage pattern has been communicated to the scheduling server. It will be appreciated that any of the blocks 510, 520, 530, 540 and/or 550 may be repeated for extended operation of the invention. The usage pattern may be refined through repeating the blocks.

Figure 6:
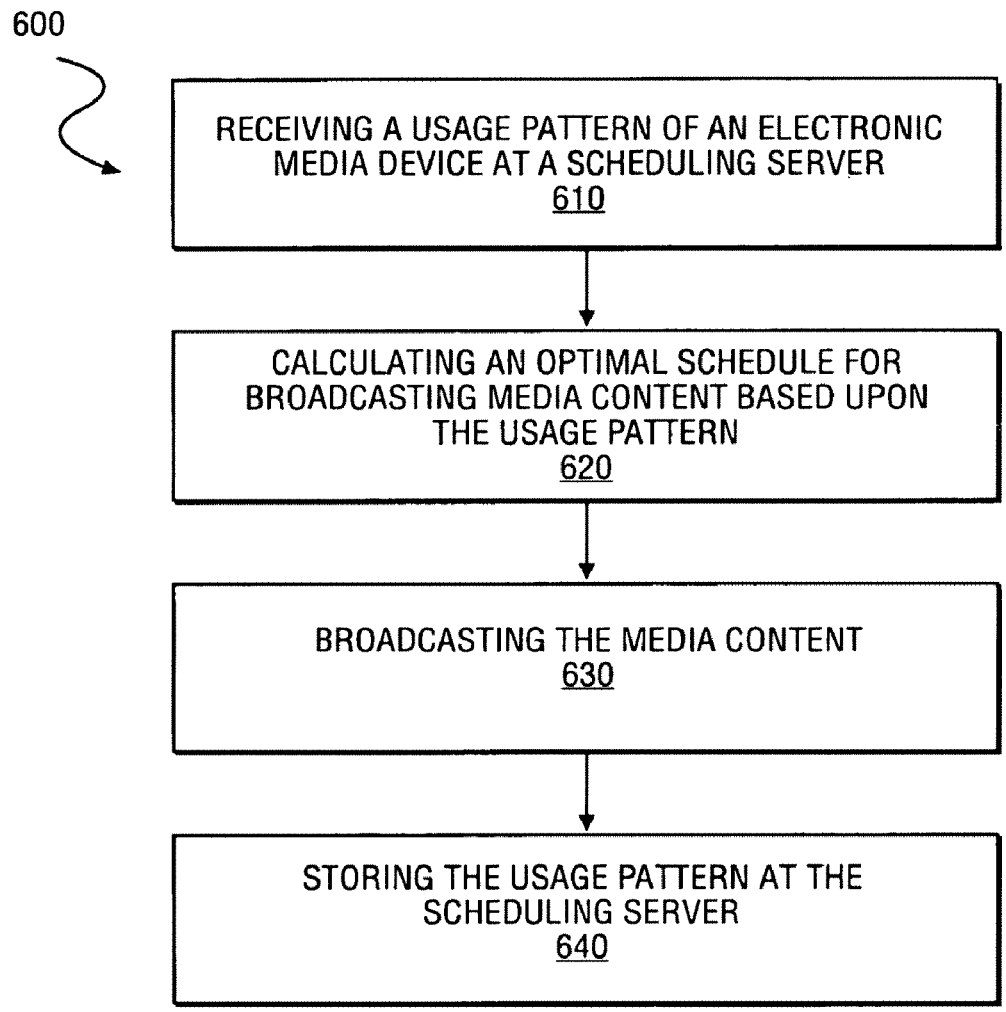
FIG. 6 is a flow diagram of a method to be performed according to the embodiment of the invention in FIG. 2, from a server-side perspective.

FIG. 6 is a flow diagram of a method to be performed according to the embodiment of the invention in FIG. 2, from a server-side perspective. At block 610 a usage pattern of an electronic media device is received at a scheduling server. At block 620 the optimal schedule for broadcasting the media content is calculated by the scheduling server based upon the usage pattern. At block 630, the media content is broadcast. At block 640, the usage pattern is stored at the scheduling server.

Figure 7:
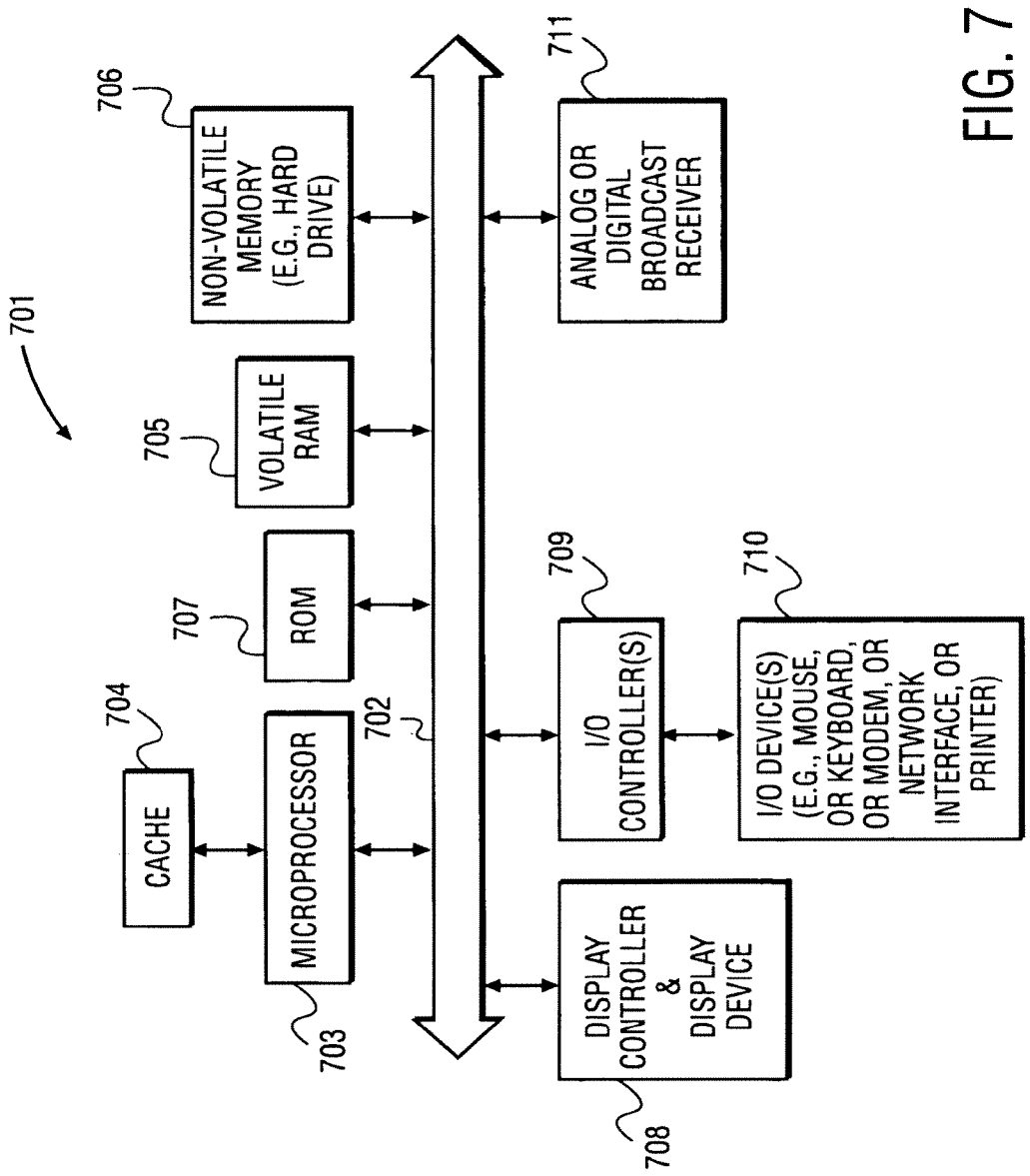
FIG. 7 is a diagram of an operating environment suitable for practicing the present invention.

FIG. 7 shows one example of a typical computer system, which may be used with the present invention. Note that while FIG. 7 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 7, the computer system 701, which is a form of a data processing system, includes a bus 702 which is coupled to a microprocessor 703 and a ROM 707 and volatile RAM 705 and a non-volatile memory 706. The microprocessor 703 is coupled to cache memory 704 as shown in the example of FIG. 7. The bus 702 interconnects these various components together and also interconnects these components 703, 704, 705, and 706 to a display controller and display device 708 and to peripheral devices such as input/output (I/O) devices which may be mice, keyboards, modems, network interfaces, printers and other devices which are well known in the art. The I/O devices may also include an interface or other device to implement a backchannel for communication between client device 120 and scheduling server 130. Typically, the input/output devices 710 are coupled to the system through input/output controllers 709. An analog or digital broadcast receiver 711 may be connected to bus 702 to tune to broadcast channels and receive media content. The volatile RAM 705 is typically implemented as dynamic RAM (DRAM) which requires power continually in order to refresh or maintain the data in the memory. The non-volatile memory 706 is typically a magnetic hard drive or a magnetic optical drive or an optical drive or a DVD RAM or other types of memory systems which maintain data even after power is removed from the system. Typically, the non-volatile memory will also be a random access memory although this is not required. While FIG. 7 shows that the non-volatile memory 706 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 702 may include one or more buses connected to each other through various bridges, controllers and/or adapters as is well known in the art. In one embodiment the I/O controller 709 includes a USB (Universal Serial Bus) adapter for controlling USB peripherals.

It will be apparent from this description that aspects of the present invention may be embodied, at least in part, in machine-executable instructions, e.g. software. That is, the techniques may be carried out in a computer system or other data processing system in response to its processor, such as a microprocessor, executing sequences of instructions contained in a memory, such as ROM 707, volatile RAM 705, non-volatile memory 706, cache 704 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 703.

Figure 8:
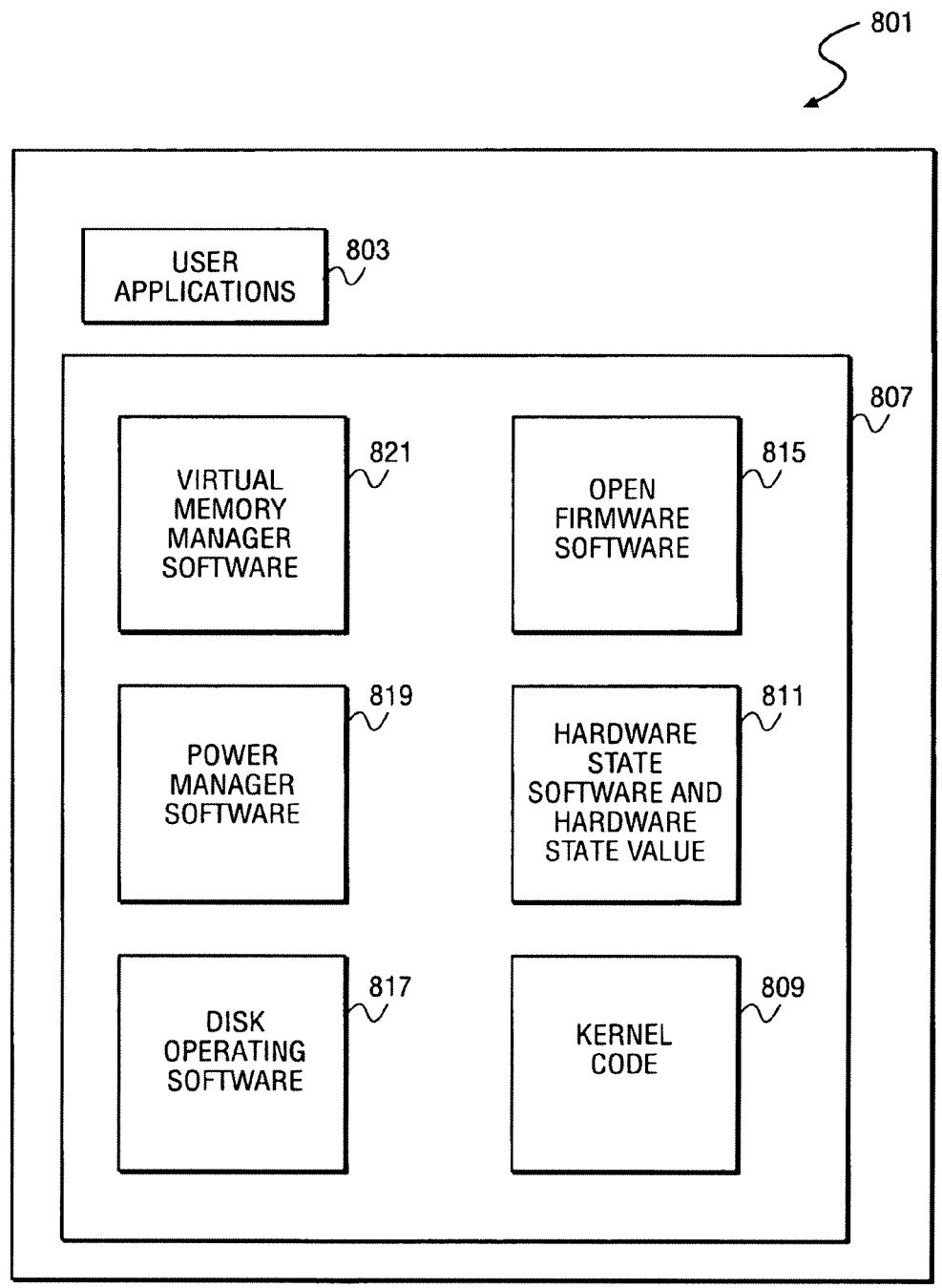
FIG. 8 is a diagram of a computer readable media, which may be used within an operating environment, such as the operating environment of FIG. 7, according to one embodiment of the present invention.

FIG. 8 shows an example of a computer readable media, which may be used with the data processing system according to one embodiment of the present invention. The computer readable media contains data and executable software which when executed in the data processing system such as a digital processing system cause the system to perform the various methods of the present invention. As noted above, this executable software and data may be stored in various places including for example the ROM 707, the volatile RAM 705, the non-volatile memory 706 and/or the cache 704. Portions of this software and/or data may be stored in any one of these storage devices. The media 801 for example may be primarily the volatile RAM 705 and the non-volatile memory 706 in one embodiment. The user applications 803 represent software applications, which are executing on the computer system, such as a word processing application or a spreadsheet application, an Internet web browser application, or a broadcast time feedback information application. The operating system 807 includes the Open Firmware software 815 which may be stored in the ROM 707 and loaded into RAM 705 at boot up. The hardware state software and hardware state value 811 is the software which generates the hardware state value. The kernel code 809 represents the kernel of the operating system and performs numerous tasks. The virtual memory manager software 821 controls the virtual memory process. This typically involves maintaining a map of page data which represents the state of data in all the virtual memory which includes the physical RAM such as volatile RAM 705 and a portion of the non-volatile memory 706 which has been designated as part of the virtual memory of the system. The virtual memory manager software will be performing conventional virtual memory processes as is known in the art. The power manager software 819 performs the various power managing operations such as notifying applications and the system and drivers of changes to the power consumption state of the system. The software may also monitor the state of a computer battery to determine whether sufficient power exists to continue to operate and displays alerts to the user indicating the status of the battery and the power status of the system. The disk operating system software 817 performs the conventional functions of a disk operating system. This typically includes controlling the operation of a hard disk drive which in many examples is the non-volatile memory 706 which serves as a virtual memory for the volatile RAM 705.

It will be further appreciated that the instructions represented by the blocks in FIGS. 3-6 are not required to be performed in the order illustrated, and that all the processing represented by the blocks may not be necessary to practice the invention.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
    recording a usage pattern of an electronic media device, wherein the usage pattern includes a pattern of user interaction with the electronic media device;
    communicating the usage pattern to a scheduling server, the usage pattern includes a first user interaction with the electronic media device, if a duration between first user interaction and an immediately subsequent user interaction is less than a predetermined period of time;
    receiving an identification of one future time period for receiving television program broadcast media content comprising actual television programs by datacasting during a time period when receiver resources are calculated to be unutilized by the user to view broadcast media content, the time period calculated by the scheduling server based on a likelihood of inactivity of the electronic media device according to the usage pattern; and
    receiving the actual television programs by datacasting during the time period.

2. The method of claim 1, further comprising storing the programs for use by the electronic media device.

3. The method of claim 1, wherein the recording is comprised of recording at least one of the group consisting of:
    day of use;
    time of use; and
    elapsed time of use.

4. The method of claim 1, wherein the pattern of user interaction comprises at least one of the group consisting of:
    turning the electronic media device on or off;
    adjusting a volume of the electronic media device; and
    recording data with the electronic media device.

5. The method of claim 1, wherein the electronic media device is selected from the group consisting of:
    a television (TV);
    an audio receiver; and
    a digital processing system.

6. The method of claim 1, wherein receiving the programs by datacasting includes receiving the programs by datacasting when receiver resources of the media device are unutilized by real time use by the user to view broadcast media content.

7. The method of claim 6, wherein the television program broadcast media content includes a plurality of television programs to be displayed during a plurality of different time periods, wherein each different time period is different than every other different time period and is different than the time period of the datacasting.

8. A method comprising:
    receiving a usage pattern of a selected electronic media device, wherein the usage pattern includes a pattern of user interaction with the selected electronic media device;
    calculating, based on a likelihood of inactivity of the selected electronic media device according to the usage pattern, a time period for the selected media device for datacasting television program broadcast media content comprising actual television programs, the datacasting during a time period when receiver resources are calculated to be unutilized by the user to view broadcast media content, the usage pattern includes a first user interaction with the selected electronic media device, if a duration between first user interaction and an immediately subsequent user interaction is less than a predetermined period of time;

using the time period to identify one future time period for datacasting the television program broadcast media content to the selected media device; and transmitting the actual television programs by datacasting the television program broadcast media content to the selected media device during the one future time period for datacasting.

9. The method of claim 8, further comprising datacasting the television program broadcast media content during the time period, wherein the time period has a pre-defined likelihood of a receiving device communicatively coupled to the selected electronic media device being able to receive the television program broadcast media content.

10. The method of claim 8, further comprising datacasting the television program broadcast media content during the time period and when receiver resources of the media device are unutilized by real time use by the user to view broadcast media content 11. The method of claim 8, wherein the television program broadcast media content includes a plurality of television programs to be displayed during a plurality of different time periods, wherein each different time period is different than every other different time period and is different than the time period of the datacasting.

12. The method of claim 8, wherein the selected electronic media device is selected from the group consisting of:
 a television (TV);
 an audio receiver; and
 a digital processing system.

13. An apparatus comprising:
 a client device communicatively coupled to an electronic media device to record a usage pattern of an electronic media device, wherein the usage pattern includes a pattern of user interaction with the electronic media device;
 the client device to communicate the usage pattern to a scheduling server, the usage pattern includes a first user interaction with the electronic media device, if a duration between first user interaction and an immediately subsequent user interaction is less than a predetermined period of time;
 the client device to receive an identification of one future time period for receiving television program broadcast media content comprising actual television programs by datacasting during a time period when receiver resources are calculated to be unutilized by the user to view broadcast media content, the time period calculated by the scheduling server based on a likelihood of inactivity of the electronic media device according to the usage pattern; and
 the client device to receive the actual television programs by datacasting during the time period.

14. The apparatus of claim 13, the client device to receive the programs by datacasting during the time period and when receiver resources of the media device are unutilized by real time use by the user to view broadcast media content.

15. The apparatus of claim 13, further comprising the client device receiving a datacast of the media content during the time period from a media broadcast device communicatively coupled to the scheduling server.

16. The apparatus of claim 13, further comprising a backchannel to facilitate communication between the client device and the scheduling server, wherein the television program broadcast media content includes a plurality of television programs to be displayed during a plurality of different time periods, wherein each different time period is different than every other different time period and is different than the time period of the datacasting.

17. An apparatus comprising:
 a scheduling server communicatively coupled to the client device to receive a usage pattern of a selected electronic media device, wherein the usage pattern includes a pattern of user interaction with the selected electronic media device;
 the scheduling server to calculate, based on a likelihood of inactivity of the selected electronic media device according to the usage pattern, a time period for the selected media device for datacasting television program broadcast media content comprising actual television programs, the datacasting during a time period when receiver resources are calculated to be unutilized by the user to view broadcast media content, the usage pattern includes a first user interaction with the selected electronic media device, if a duration between first user interaction and an immediately subsequent user interaction is less than a predetermined period of time;
 the scheduling server to use the time period to identify one future time period for datacasting the television program broadcast media content to the selected media device; and
 transmitting the actual television programs by datacasting the television program broadcast media content to the selected media device during the one future time period for datacasting.

18. The apparatus of claim 17, further comprising the scheduling server to datacast the media content during the time period and when receiver resources of the media device are unutilized by real time use by the user to view broadcast media content.

19. The apparatus of claim 17, further comprising a backchannel to facilitate communication between the client device and the scheduling server, wherein the television program broadcast media content includes a plurality of television programs to be displayed during a plurality of different time periods, wherein each different time period is different than every other different time period and is different than the time period of the datacasting.

* * * * *